(No Model.)
L. W. HAMPTON.
VEHICLE.
No. 527,058. Patented Oct. 9, 1894.
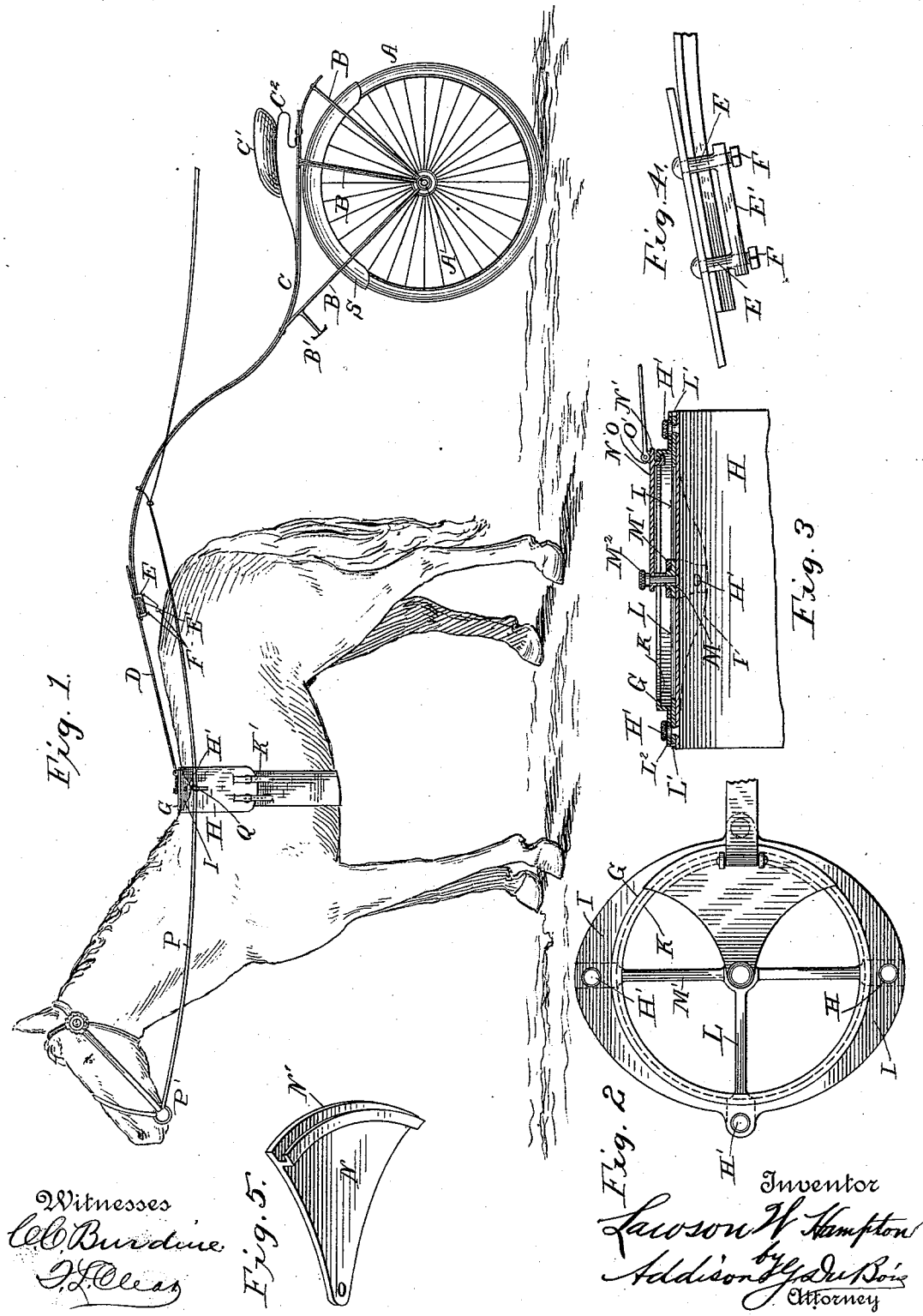
Witnesses
C. C. Burdine
J. L. Clear
Inventor
Lawson W. Hampton
by Addison G. du Bois
Attorney
THE NORRIS PETERS CO., PHOTO-LITHO., WASHINGTON, D. C.

UNITED STATES PATENT OFFICE.

LAWSON W. HAMPTON, OF ELIZABETHTON, TENNESSEE.

VEHICLE.

SPECIFICATION forming part of Letters Patent No. 527,058, dated October 9, 1894.

Application filed March 12, 1894. Serial No. 503,337. (No model.)

*To all whom it may concern:*

Be it known that I, LAWSON W. HAMPTON, of Elizabethton, county of Carter, and State of Tennessee, have invented certain new and useful Improvements in Vehicles; and I do hereby declare the following to be full, clear, and exact description of the invention, such as will enable others skilled in the art to which it appertains to make and use the same, reference being had to the drawings hereunto annexed and to the letters of reference marked thereon.

My invention relates to that class of vehicles which are provided with only one wheel and suitably connected to the horse; and the principal feature is in certain hereinafter described improvements in the means for connecting the wheel to the horse, whereby he is allowed greater freedom of movement and whereby the connection is made more secure and desirable.

In the drawings Figure 1 represents a side elevation of a horse having my improvements applied; Fig. 2, a plan of the means for connecting the reach or shaft to the horse; Fig. 3, a longitudinal section of the same; Fig. 4, a detail view showing the joint between the several sections of the said reach or shaft; and Fig. 5 a detail perspective of the swinging arm and its attachments which form a part of the means for connecting the reach to the horse.

The vehicle proper consists of the wheel A provided with the axle A' and having attached thereto, through the medium of the axle, the six braces B. These braces are three for each side of the wheel and spread out longitudinally from the axle and are joined to the rear end of the reach C. The connection between the braces B and reach C is of a rigid character, whereby the machine is rendered as secure as possible. Secured to the reach C and directly over the wheel A, is the seat or saddle C', which has a spring $C^2$ interposed between it and the reach whereby it is given the proper degree of elasticity.

The foremost of the braces B are joined to the reach C at a point forward of the reach and provided near their ends with the stirrups B', in which the feet of the driver may be placed. From the seat C', the reach C extends forwardly for a slight distance and thence curves upwardly and forwardly so as to lie at its front extremity, above the horse's back and approximately parallel therewith. The reach C co-operates with a companion section D and the two form the reach proper.

Section D is secured at its forward end to the horse as hereinafter explained, while its rear end is joined to the section C by means of the device of Fig. 4 which consists of the downwardly extending yokes E secured to the section D in longitudinal alignment with each other, and a short distance apart. Formed integral with or rigidly secured to the yokes E is the brace E' which extends from one yoke to another and serves to render them rigid and secure. Operating in each of the yokes E are the set screws F which move vertically and are adapted to pass into engagement with the reach-section C. By this means the two sections may be joined and the length of the whole device, composed of the two sections, adjusted according to the conditions under which the improvements are used.

The reach section C is formed of T-iron arranged with its horizontal portion or arm upward, this making the reach as strong as possible; while the section D is arranged to lie flush with the said arm. The immediate connection between the horse and reach section D, is shown in detail by Figs. 3 and 4, and consists of the circular rim G, rigidly secured to the girth H, by means of the bolts H'. The rim G is formed with the flange I, which curves to conform to the shape of the horse's back, and it is by this means that the rim proper is secured to the girth H, while the rim arises vertically from the flange and is formed with the internally extending flange K thereon. The flange I is narrowest at the front and rear extremities of the rim G, while it is lengthened at the sides so as to extend down the sides of the horse and thus sit firmly thereon.

The girth H may be of any preferred construction, and is provided with the fastening devices K' whereby it is secured to the horse by embracing his chest, as shown. Thus the rim G is secured to the horse. Extending across the rim G and parallel with the reach is the bar L which is rigidly secured at its ends in the recesses L' of the lugs $L^2$, so as to lie flush with the under sides of the lugs. This bar L is formed with a square stud M, on its upper side and midway its ends, which stud is adapted for the reception of the cross bar M', which extends at right angles to the bar L, and is curved to conform to the shape of the horse's back, and secured at its end to the laterally elongated side portions of the flange I. Mounted in the bar L at the stud M is the vertically extending bolt or spindle $M^2$, upon which is mounted the sector or segmental block N. This device is attached at its axial or center point to the bolt $M^2$ and is of such a radius that its edge will project out to the flange K of the rim G at which point the sector is provided with the horizontal and parallel flanges N' which are adapted to lie one on each side of the flange K and make it possible for the block N, to swing horizontally in a complete circle, and yet be incapable of movement in a vertical line. Formed integral with the upper face of the block N, are the oppositely arranged lugs O, between which the front end of the reach section D, is arranged and pivotally secured by means of the pin O'. Thus it will be seen that the reach will be free to swing horizontally, so as to accommodate itself to the movements of the vehicle attached and on the other hand, that the rim G will be free to swing on the reach, to compensate for the movements of the horse. During this operation the reach sections D and C are operating to support the wheel and its attachments, or the vehicle, and owing to their construction it will be impossible for the wheel to tilt without a similar movement of the horse.

The principal function of the arrangement whereby the reach is connected to the horse's back, is to allow the horse easier and more unstrained movements, for, since the girth B is the only harness employed, his limbs will not be encumbered and retarded as in other devices of this class. S indicates a fender or mud guard which is arranged over the wheel and operates to keep the mud from being thrown on the driver. This I prefer to construct of aluminum or other light material.

My invention is particularly adapted for use as a racing and training vehicle and its adaptability to this purpose will be readily appreciated since its great lightness and ease of operation will make it very effective. I also prefer to construct the reach and the attachments of the wheel of aluminum, so as to make them much lighter than otherwise, though this is not essential. It is also desirable to make the tire of wheel A, of the pneumatic class, as shown in Fig. 1. All of this is, however immaterial to the invention and may be applied or dispensed with without affecting the essence of the device.

P, indicates the reins for driving the horse and these together with the bridle P', may of course be of any construction. The girth H may be provided with the ring or rein support Q whereby the rein is held, and the reach section C is provided with a similar attachment R.

It will be understood that the reach is rigid, and that the curves formed therein are of a permanent character.

Having thus described my invention, what I claim is—

1. A vehicle consisting of a single wheel, a reach or shaft having one end connected to the wheel, a horizontal circular way or guide adapted to be secured to the horse, a block revolubly mounted at the center of the said way or guide and adapted to swing around the extent of the same, the block having its outer end slidably connected to the guide, and the reach being connected at its forward end to the block, whereby the vehicle is attached to the horse, substantially as described.

2. A vehicle consisting of a single wheel, a reach connected at one end to the wheel and extending forwardly toward the horse, a circular way or guide adapted to be secured to the horse, a cross bar extending below the guide and across the same, a spindle connected to the bar and arising vertically therefrom and in the center of the guide and a block revolubly mounted on the spindle and having therein parallel flanges adapted to embrace the way or guide, whereby the block will be free to swing on a vertical axis, the forward end of the reach being connected to the block, substantially as described.

LAWSON W. HAMPTON.

Witnesses:
W. M. SHELL, Jr.,
J. R. BURROW.